(No Model.)

J. W. MURRAY.
AUTOMATIC SWITCH STAND.

No. 517,878. Patented Apr. 10, 1894.

WITNESSES:
Lewis E. Flanders
Luis Moulton

INVENTOR
John W. Murray
BY
Luther V. Moulton
ATTORNEY.

UNITED STATES PATENT OFFICE.

JOHN W. MURRAY, OF JENISON, MICHIGAN.

AUTOMATIC SWITCH-STAND.

SPECIFICATION forming part of Letters Patent No. 517,878, dated April 10, 1894.

Application filed January 6, 1893. Renewed February 24, 1894. Serial No. 501,431. (No model.)

*To all whom it may concern:*

Be it known that I, JOHN W. MURRAY, a citizen of the United States, residing at Jenison, in the county of Ottawa and State of Michigan, have invented certain new and useful Improvements in Automatic Switch-Stands; and I do hereby declare the following to be a full, clear, and exact description of the invention, such as will enable others skilled in the art to which it appertains to make and use the same.

My invention relates to improvements in switch stands that are adapted to be automatically shifted by the flanges of car wheels passing between the rails, and its object is to provide the same with certain new and useful features, hereinafter more fully described and particularly pointed out in the claims, reference being had to the accompanying drawings, in which—

Figure 1:
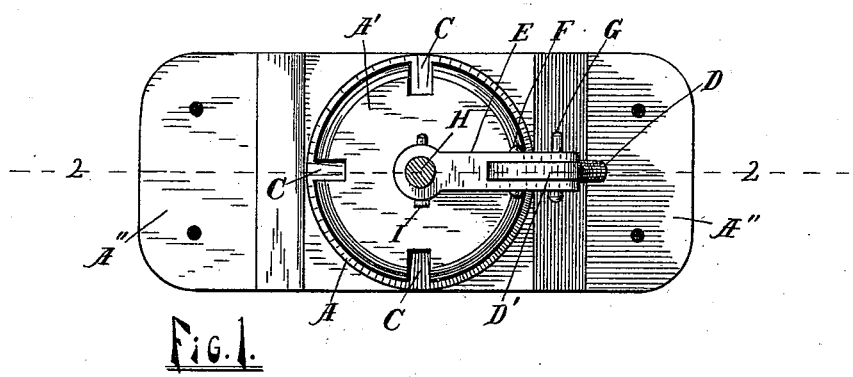
Figures 2, 3:
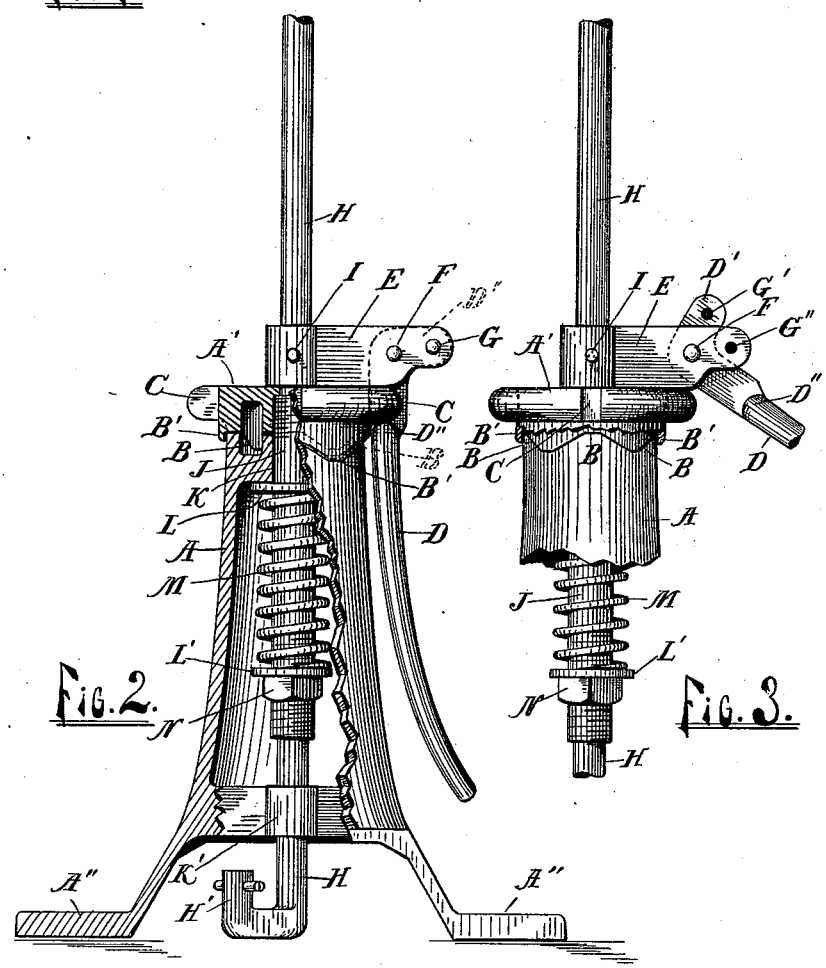

Figure 1 is a plan view of a device embodying my invention; Fig. 2 a side elevation of the same partially in vertical section on the line 2—2 of Fig. 1; and Fig. 3 a detail showing more fully the clutch in the stand case, and position of the lever when shifting the switch by hand.

Like letters refer to like parts in all of the figures.

The casing A is substantially a hollow truncated cone, having a suitable base A″, and crank shaft bearings K and K′ in its axis, and terminating at its upper end in a slip clutch B having inclined faces, which engages a corresponding clutch on the under side of a detached cap A′. A curtain B′ on the cap overhangs the clutch and protects it from sand and dust. A sleeve J is rigidly attached to the center of said cap and extends downward and through a suitable distance below the upper bearing K, being screw threaded at its lower end and provided with an adjustable nut N. Between this nut and the upper bearing and surrounding the sleeve J is a compressible coiled spring M, having washers L and L′ at its respective ends engaging respectively the under side of the bearing K and the upper side of the nut N. The sleeve J both rotates and moves longitudinally in the bearing K thus permitting the head A′ to rise and turn to shift its own position upon the top of the stand A. The clutch re-engaging when the cap has turned through the distance required to shift the switch, which is usually one-fourth of a revolution, or ninety degrees. The spring M serves to exert a downward pressure upon the sleeve and cap and hold the clutch engaged with sufficient force to prevent shifting the switch by hand, and at the same time yielding and permitting the cap and sleeve to rise and the clutch to shift when the flange of the car wheel runs between the rails and exerts sufficient pressure upon the crank shaft H, which shaft is longitudinally movable in the lower bearing K′ and passes vertically through the sleeve J being provided with a radial arm E, which is detachably secured to said shaft by a pin I. Said arm E rests and turns upon the cap A′ and serves to support the shaft H, and also adjustably secure the same to said cap, for which purpose to the end that the switch may be shifted by hand, said arm is divided at its outer end and provided with a bell crank lever pivoted above the outer rim of said cap, which latter is provided with notches C, at each ninety degrees of the circumference, or at suitable points for shifting the switch, into which notches the lower arm D of said lever passes, thus preventing the crank shaft from turning in the cap and sleeve. The short arm D′ of the bell crank lever and the outer end of the arm E are provided with holes G′ and G″, which are in line when the arm D is in any notch C, and through these holes is thrust a pin G to secure said lever in place.

By turning the nut N the tension of the spring M may be suitably adjusted to properly resist the shifting of the clutch B.

By the described construction I materially reduce the cost of manufacture, and number of parts in the structure; also as none of the parts against which the spring M exerts its pressure are attached to the crank shaft; said spring does not retard the rotation of said shaft when shifted by hand, as is the case in structures in which the spring engages a collar, or clutch fixed on said shaft.

When necessary to remove the crank shaft for repairs, or other purposes, the pin I is removed and the shaft can then be withdrawn from the arm E, sleeve J and bearing K′ without releasing the tension on the spring or in any way disturbing any of the parts connected therewith, which constitute the automatic shifting mechanism, which is obviously a great advantage and saving of labor.

What I claim is—

1. In a switch stand having a slip clutch, consisting of a fixed part, and a rotative part, having interlocking inclined projections, and a crank shaft adjustably connected to said rotative part, a sleeve surrounding said shaft and connected to said rotative part, and a spring engaging said sleeve, and forcing said projections into engagement independent of said crank shaft, substantially as described.

2. In a switch stand, a fixed case and a rotative cap, having interlocking inclined projections, a sleeve attached to said cap, and a spring engaging said sleeve, and forcing said projections into engagement, substantially as described.

3. In a switch stand, a fixed case and rotative cap, interlocking inclined projections on the same, a sleeve attached to said cap and journaled in a bearing in said case, an adjustable nut on said sleeve and a spring surrounding said sleeve, and engaging said nut and journal bearing at its respective ends, substantially as described.

4. In a switch stand a fixed casing, having upper and lower journal bearings in its axis, a detached head having a sleeve engaging the upper bearing, a slip clutch connecting said head and casing, a crank shaft journaled in said sleeve and lower bearing and mechanism to adjustably connect said shaft and cap, substantially as described.

5. In a switch stand, a fixed casing, having upper and lower bearings in its axis, a detached cap on said casing a sleeve attached to the axis of said cap and passing downward through and beyond said upper bearing, a nut on said sleeve, and a spring surrounding said sleeve and engaging said nut and bearing, and a slip clutch having oppositely inclined interlocking surfaces and connecting said stand and cap, and a crank shaft journaled in said sleeve and lower bearing and adjustably connected to said cap, substantially as described.

6. In a switch stand, a fixed casing, consisting of a truncated hollow cone, having upper and lower journal bearings in its axis, and terminating at the top in a series of oppositely inclined projections, a detached cap having corresponding interlocking projections on its under surface, a sleeve attached to the axis of said cap, said sleeve journaled in said upper bearing and projecting below the same, a nut near the lower end of said sleeve, a spring on said sleeve engaging said nut and bearing, and forcing them apart, a crank shaft journaled in said lower bearing and sleeve and longitudinally movable in the same, an arm on said shaft above said cap, and a lever pivoted in said arm and engaging a series of notches in the rim of said cap, substantially as described.

7. In a switch stand, a fixed casing, a sleeve journaled in the axis of said casing, a cap attached to the upper end of said sleeve and connected to said stand by a slip clutch permitting said cap to partially rotate under heavy pressure, a crank shaft journaled in said sleeve, an arm detachably secured to said shaft, and resting upon said cap, a bell crank lever pivoted in said arm and engaging a series of notches in the rim of said cap, and a pin passing through the short arm of said lever and the end of said arm to secure the same in place in said notches, substantially as described.

In testimony whereof I affix my signature in presence of two witnesses.

JOHN W. MURRAY.

Witnesses:
MARY BENSON ALLEN,
LOIS MOULTON.